US011012427B2

(12) United States Patent
Delightson (10) Patent No.: US 11,012,427 B2
(45) Date of Patent: May 18, 2021

(54) RSA TRUSTED NETWORKS: RSA PACKET FRAMES FOR ADVANCED NETWORKING SWITCHES

(71) Applicant: EMC IP Holding Company LLC, Hopkinton, MA (US)

(72) Inventor: Livingston Paul Delightson, Tirunelveli (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 167 days.

(21) Appl. No.: 16/014,984

(22) Filed: Jun. 21, 2018

(65) Prior Publication Data

US 2019/0394177 A1 Dec. 26, 2019

(51) Int. Cl.
*H04L 29/06* (2006.01)
*H04L 9/08* (2006.01)
(52) U.S. Cl.
CPC ........ *H04L 63/0464* (2013.01); *H04L 9/0869* (2013.01); *H04L 63/0442* (2013.01); *H04L 63/12* (2013.01); *H04L 63/162* (2013.01)
(58) Field of Classification Search
CPC ............. H04L 63/0464; H04L 63/0442; H04L 63/162; H04L 9/0869; H04L 63/12
See application file for complete search history.

(56) References Cited

U.S. PATENT DOCUMENTS

| 9,292,711 | B1* | 3/2016 | Roth | G06F 21/71 |
| 2003/0163692 | A1* | 8/2003 | Kleinsteiber | H04L 63/08 |
| | | | | 713/169 |
| 2006/0198514 | A1* | 9/2006 | Lyseggen | H04L 9/3231 |
| | | | | 380/28 |
| 2007/0171921 | A1* | 7/2007 | Wookey | G06F 9/5027 |
| | | | | 370/401 |
| 2011/0276718 | A1* | 11/2011 | Steiner | H04L 45/64 |
| | | | | 709/241 |
| 2013/0312082 | A1* | 11/2013 | Izu | H04L 63/02 |
| | | | | 726/13 |
| 2014/0230073 | A1* | 8/2014 | Liang | H04N 21/42623 |
| | | | | 726/27 |
| 2016/0021597 | A1* | 1/2016 | Hart | H04W 72/04 |
| | | | | 370/329 |
| 2017/0243424 | A1* | 8/2017 | Shirai | G07C 9/00309 |
| 2017/0262837 | A1* | 9/2017 | Gosalia | G06Q 20/3255 |
| 2019/0044920 | A1* | 2/2019 | Szymanski | H04L 49/101 |

* cited by examiner

*Primary Examiner* — Mohammad A Siddiqi
(74) *Attorney, Agent, or Firm* — Womble Bond Dickinson (US) LLP (57) ABSTRACT

Embodiments are described for enhanced security in a switched network using RSA security between hops of a transmission path of a data frame from an origination node to a destination node, via one or more intervening switches. Each switch and node in a switched network can be configured for "RSA security enabled" or "RSA security disabled." RSA security can be enabled, or disabled, for the whole network. RSA security can be enabled for all switches (but not nodes) or selectively enabled for switches. If two adjacent devices (nodes or switches) have RSA security enabled, then an RSA secure frame is generated to transmit data on that hop of a transmission path between an originating node and destination node. RSA encryption keys can be different for each hop on the transmission path. RSA token seeds can be regenerated periodically to increase the difficulty of learning an encryption key for any hop.

21 Claims, 9 Drawing Sheets

Selectively configure switches for RSA security

FIG. 1A

All nodes and switches configured for no RSA security

FIG. 1B

All nodes and switches configured for RSA security

FIG. 1C

All switches configured for RSA security

FIG. 1D

Selectively configure switches for RSA security

RSA TRUSTED NETWORKS: RSA PACKET FRAMES FOR ADVANCED NETWORKING SWITCHES

TECHNICAL FIELD

This disclosure relates to the network security in a switched network environment.

BACKGROUND

RSA security is named after the inventors of the security method: Ron Rivest, Adi Shamir, and Leonard Adleman who first described the algorithm in 1978. RSA security is based on a sending node encrypting a frame of data to be sent to a receiving node, using a public key of an asymmetric key pair. The receiving node can then decrypt the data frame using a private key corresponding to the public key used to encrypt the frame of data.

Security for switched networks of the prior art include end-to-end encryption, or no encryption at all. Having a single encryption scheme for end-to-end communication in a switched network gives potential hackers multiple opportunities to hack the same encryption of a data stream from a sending node to a receiving node at each of the intervening switches, as well as at the sending and receiving nodes.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for enhanced security in a switched network by using RSA security between hops of a transmission path of a data frame from an origination node to a destination node, via one or more intervening switches. In an embodiment, the switched network can be configured into one of four modes: (1) "RSA null" mode wherein all nodes and all switches in the switched network are explicitly configured not to enable RSA security; (2) "RSA-for-all" wherein all nodes and all switches in the switched network are configured to use RSA security for data frames for each hop on a transmission path between the originating node and destination node; (3) "all switch-on-switch" mode, wherein all switches, but no nodes, are configured for RSA security; and (4) "selective switch-on-switch" mode, wherein some switches, but no nodes, are configured for RSA security. In Applicant's RSA security, a "token" creates an authentication code at fixed intervals using a built-in clock and a factory encoded key, known as a "seed." Successful authentication between two parties is achieved by referring to the same token seed at both sides of a communication "hop" in a transmission path from a sending client device to a receiving client device. Using the tokens seeds, as an embodiment of the encryption/decryption pairs, on a hop-to-hop data encryption, secures the data frames between each hop in a network.

Nodes and switches can generically be termed "devices," unless a node or a switch is specifically intended. Each device (nodes and switches) in the switched network can have an RSA adjacency table that lists devices (nodes and switches) that are adjacent to the device on the network. For each adjacent device, if there is an RSA token seed in the adjacency table for the adjacent device, then that adjacent device is configured with RSA security enabled. For any given hop along a transmission path, if both the sending device and receiving device are configured with RSA security enabled, then the sending device will transmit a data frame to the receiving device as an RSA secure frame. An RSA secure frame is generated by encrypting the data frame using a key that is based at least in part on an RSA token seed of the receiving device. In an embodiment, the data frame is encrypted by the sending device with a public key of the receiving device. The sending device computes a checksum of the encrypted data frame and appends the checksum to the encrypted data frame to generate the RSA secure frame. The RSA secure frame is transmitted to from the sending device to the receiving device. The receiving device can verify the checksum of the RSA secure frame, then decrypt the RSA secure frame using a private key of the receiving device.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIGS. 1A-1D illustrate, in block diagram form, configurations 100 of a switched network having enhanced security. Switches and nodes can be individually configured between each segment ("hop") of a transmission path in a switched network, in accordance with some embodiments. RSA security is used for a hop when both ends of the hop are configured for RSA security.

Figure 1A:
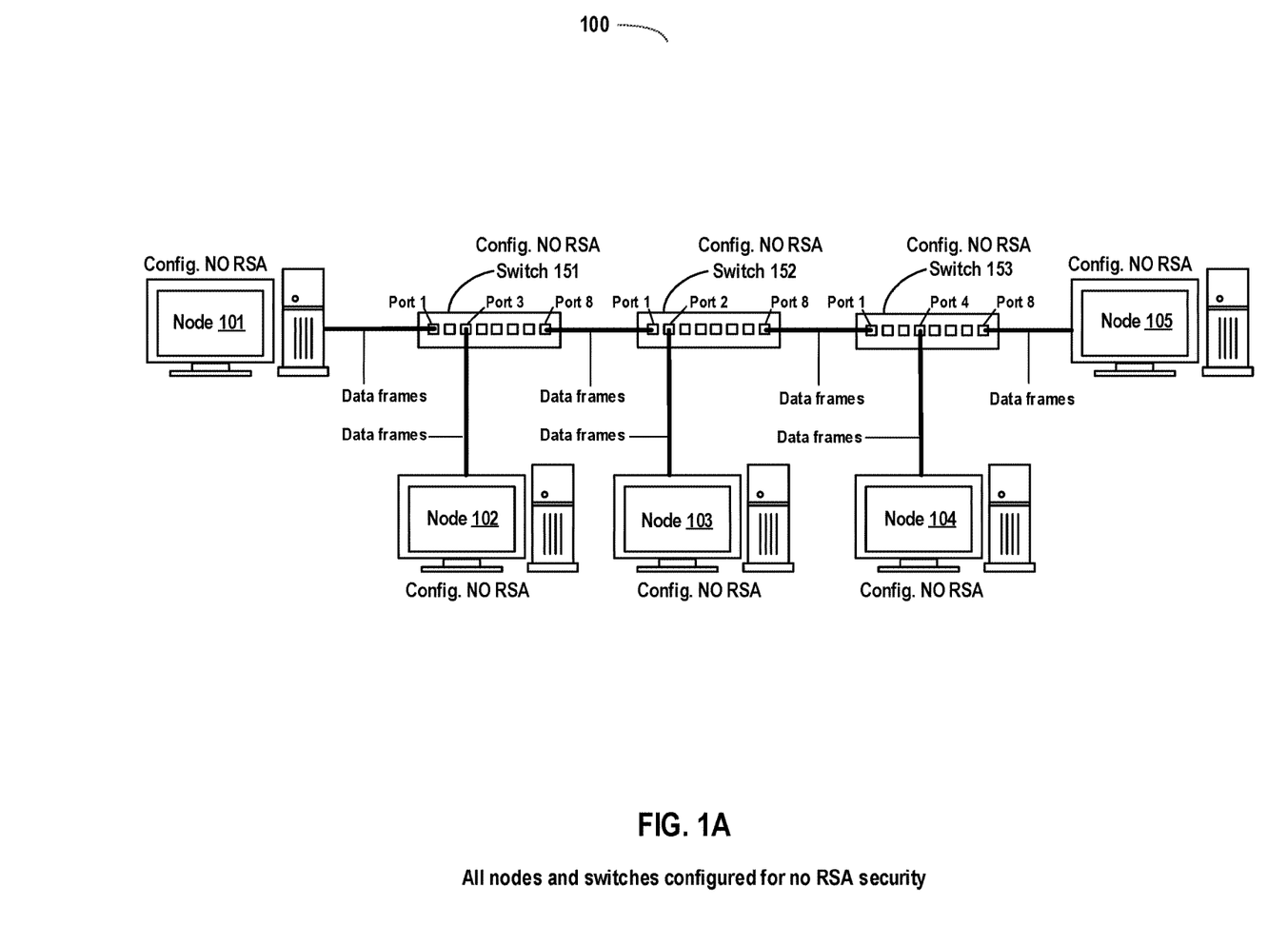
FIGS. 1A-1D illustrate, in block diagram form, configurations of a switched network having enhanced security, individually configurable between each "hop" in a switched network, in accordance with some embodiments.

Referring to FIG. 1A, a switched network 100 having enhanced security as described herein can include a plurality of nodes, such as nodes 101 through 105 (collectively or individually, 10x), and one or more intervening switches, e.g. switches 151 through 153 (collectively or individually, 15x). Unless a node or a switch is specifically stated, nodes and switches may be generically termed "devices." Each of the devices (again, nodes 101-105 and switches 151-153 are all devices) can include RSA security logic as described more fully below, with reference to FIG. 2. Devices can be interconnected into a switched network with appropriate cabling or other communication media, such as wireless, fiber optic, or other medium. Switches 15x can have a plurality of ports, such as ports 1 through 8 shown in FIGS. 1A-1D. A switch 15x may have any number of ports. Nodes 10x can be stand-alone computing devices, virtual machines, servers, or other computing devices. Exemplary hardware for nodes 10x and switches 15x is described in detail with reference to FIG. 6, below.

Each device in the enhanced security switched network can be configured, such as by an administrator, a preconfiguration, a default configuration, or other manner of configuration, to process data frames in accordance with the configuration of the device. Switched network enhanced security ("RSA security") can be enabled or disabled for all devices on the switched network, or for all switches, or for selected switches. RSA logic in a device can be configured to process received frames and to process and transmit frames according to one of the following modes of RSA security: (1) all nodes and all switches use RSA security, (2) no nodes and no switches use RSA security, (3) all switches (but no nodes) use RSA security, and (4) selected switches (but no nodes) use RSA security. In addition, in an embodiment, each individual device in the switched network can be individually configured to use, or not use, RSA security.

An RSA secure frame is a data frame that has been encrypted using an encryption key associated with a receiving device that will, or has, received the RSA secure frame. In an embodiment, a device sending a frame of data as an RSA secure frame can first encrypt the data frame using an encryption key associated with a device that will receive the data frame. In an embodiment, the encryption key is a public key associated with the receiving device. In addition, the sending device can append a checksum of the encrypted data frame to the encrypted data frame, thereby generating the RSA secure data frame. When the receiving device receives the RSA secure data frame, the receiving device can verify the checksum of the received RSA secure data frame and decrypt the encrypted data frame using a decryption key associated with the receiving device. In an embodiment, the decryption key can be a private key of the receiving device associated with the public key of the receiving device that was used by the sending device to encrypt the data frame before sending it to the receiving device.

If the receiving device is not the end destination node, then the above process can be repeated, with the current receiving device becoming the next sending device, and a next device in the transmission path becoming the receiving device. This process is repeated until the data frame reaches the destination node in the transmission path.

Each segment of transmission ("hop") between a sending device and a receiving device can use a different encryption key, and associated decryption key, than another hop in the transmission path. The encryption key used by the sending device and the decryption key used by the receiving device are both associated with the receiving device of each hop. Each device in the enhanced secure switched network can maintain an RSA adjacency table of nodes and switches that are adjacent to the sending device. If a device in the RSA adjacency table has an RSA token seed listed for the device, then that device is configured for receiving an RSA secure data frame. If a device in the RSA adjacency table has no RSA token seed, then that device is not configured to receive an RSA secure data frame and, instead, the device can receive an unencrypted data frame. RSA token seeds in an RSA adjacency table can be periodically regenerated for each device having an RSA token seed in the RSA adjacency table. In an embodiment, the RSA token seeds can be regenerated every 24 hours.

In FIG. 1A, RSA security logic in each node 101-105 and each switch 151-153 has been configured for no RSA security. In an example, an originating node 101 can send a data frame to destination node 102 via intervening switch 151. In FIG. 1A, no RSA security is enable for any node or switch. Originating node 101 knows that it is configured not to use RSA security. Node 101 can lookup switch 151 in node 101's RSA adjacency table and find that switch 151 does not have an RSA token seed listed for switch 151. Thus, RSA security will not be used for the hop from node 101 to switch 151 because both node 101 and switch 151 do not use RSA security. Node 101 can then transmit a data frame, without encryption, to switch 151. Switch 151 can receive the unencrypted data frame. Since switch 151 is configured not to use RSA security, switch 151 will not attempt to decrypt the data frame received from node 101. Switch 151 can determine that node 102 is the next, and last, hop in the transmission path to 102. Since RSA security is used when both a sending device and receiving device are configured for RSA security, and switch 151 is not configured for RSA security, then switch 151 will not use RSA security to transmit the data frame to node 102. Switch 151 transmits the data frame to node 102.

Next, node 102 will receive the data frame from switch 151. Since node 102 is not configured to use RSA security, node 102 knows that the received data packet from switch 151 is not encrypted.

Figure 1B:
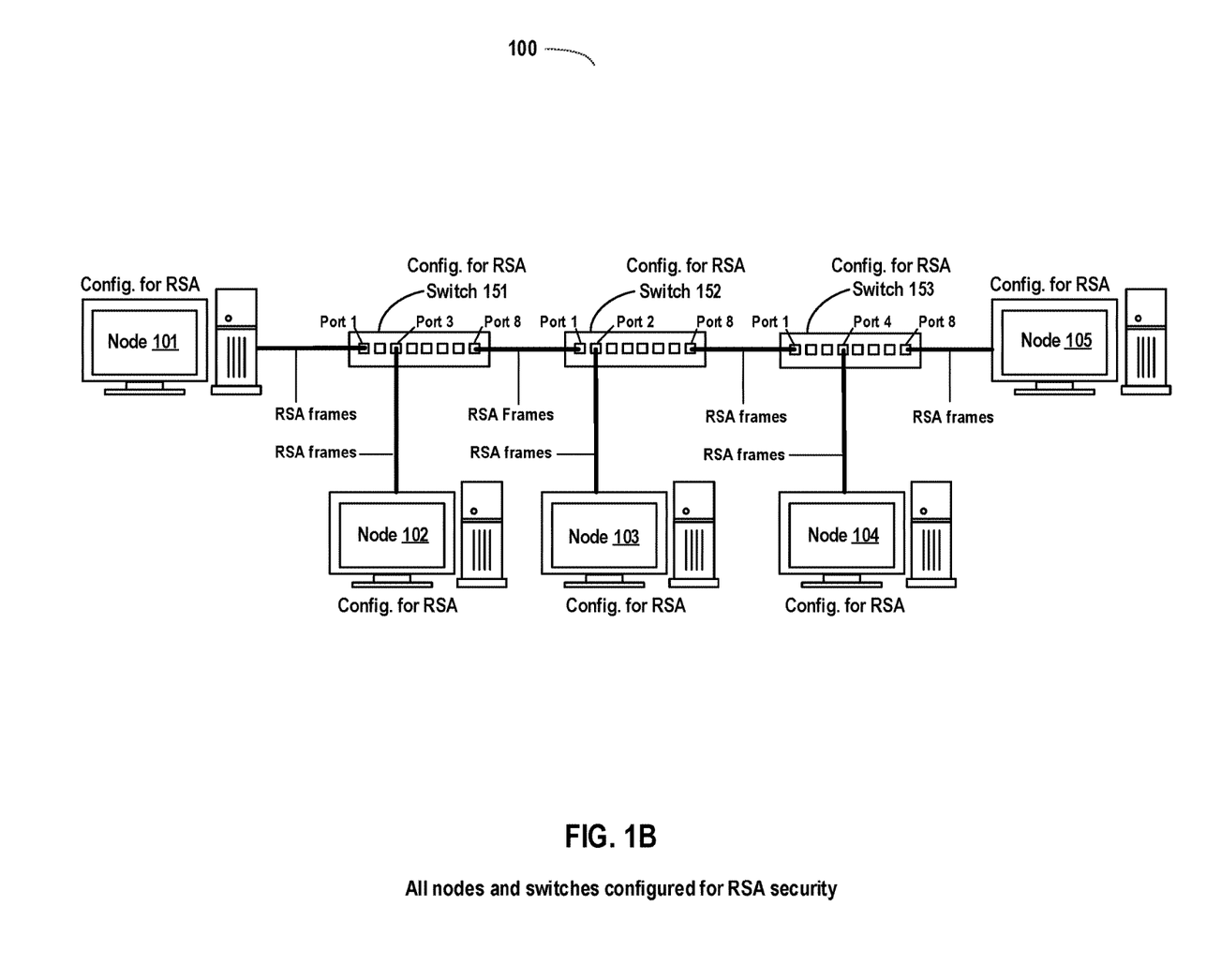

In FIG. 1B, all nodes and all switches are configured for RSA security. In this embodiment, RSA security is used between each switch and any node or switch connected to the switch. In an example, node 101 can transmit a data frame to destination node 105 via intervening switches 151, 152, and 153. Node 101 is configured for RSA security. Node 101 can determine that switch 151 is the next hop in the transmission path to node 105. Since node 101 is configured for RSA security, node 101 will transmit an RSA secure frame of data to switch 151, if switch 151 is also configured for RSA security. Node 101 can determine that switch 151 is in node 101's RSA adjacency table and that switch 151 has an RSA token seed in node 101's RSA adjacency table, meaning that switch 151 is configured for RSA security. Thus, node 101 will transmit the data frame to switch 151 using RSA security. Node 101 can encrypt the data frame using a key that is based at least in part on switch 151's RSA token seed found in node 101's RSA adjacency table. In an embodiment, node 101 can generate a checksum of the encrypted data frame and append the check sum to the encrypted data frame to generate the RSA secure frame. Node 101 can then transmit the RSA secure frame to switch 151.

Switch 151 can receive the RSA secure frame from node 101. Switch 151 is configured for RSA security. Switch 151 can determine whether sending node 101 is configured for RSA security so that switch 151 knows how to process the received frame from node 101. Switch 151 can look up node 101 in switch 151's RSA adjacency table and find that node 101 has an RSA token seed in switch 151's RSA adjacency table, meaning that node 101 is configured for RSA security. Since both node 101 and switch 151 are configured for RSA security, the frame received by switch 151 from node 101 is an RSA secure frame. Switch 151 can then verify the checksum of the received RSA secure frame and decrypt the RSA secure frame using a key of the switch 151 that is based at least in part on switch 151's RSA token seed. In an embodiment, switch 151 decrypts the RSA secure frame with a private key that corresponds to a public key that node 101 used to encrypt the data frame.

Switch 151 can determine that switch 152 is the next "hop" in the transmission path of the data frame to destination node 105. Switch 151 is configured for RSA security. Switch 151 can determine whether switch 152 is configured for RSA security. If so, then switch 151 will transmit an RSA security frame to switch 152. Switch 151 can lookup switch 152 in switch 151's RSA adjacency table and find that switch 152 has an RSA token seed in switch 151's RSA adjacency table, meaning that switch 152 is configured for RSA security. Therefore, switch 151 will use RSA security to transmit the data frame to switch 152. Switch 151 can encrypt the data frame using a key that is based at least in part on receiving switch 152's RSA token seed found in switch 151's RSA adjacency table. Switch 151 can then determine a checksum of the encrypted data frame, append the checksum to the encrypted data frame, thereby generating an RSA secure frame, and transmit the RSA secure frame to switch 152.

Switch 152 can receive the RSA secure frame from switch 151. Switch 152 knows that it is configured for RSA security. If switch 151 is also configured for RSA security, then switch 152 knows that it is received an RSA secure frame from switch 151. Switch 152 looks up switch 151 in switch 152's RSA adjacency table and find that switch 151 has an RSA token seed in switch 152's RSA adjacency table, meaning that switch 151 is configured for RSA security. Thus, the frame that switch 152 received from switch 151 is an RSA secure frame. Switch 152 can verify the checksum of the RSA secure frame and decrypt the RSA secure frame using a key based at least in part on switch 152's RSA token seed. In an embodiment, switch 152 decrypts the RSA secure frame with a private key corresponding to the public key of switch 152 that switch 151 used to encrypt the frame.

Switch 152 can then determine that switch 153 is the next hop in the transmission path of the data frame to destination node 105. Switch 152 is configured for RSA security. If switch 153 is also configured for RSA security, then switch 152 will use RSA security to transmit the data frame to switch 153. Switch 152 can lookup switch 153 in switch 152's RSA adjacency table and find that switch 153 has an RSA token seed in switch 152's RSA adjacency table, meaning that switch 153 is configured for RSA security. Switch 152 can encrypt the data frame with a key that is based at least in part on switch 153's RSA token seed. Switch 152 can perform a checksum on the encrypted data frame and append to the checksum to the encrypted data frame, thereby generating an RSA secure frame. Switch 152 can then transmit the RSA secure frame to switch 153.

Switch 153 can receive the RSA secure frame from switch 152. Switch 153 is configured for RSA security. If switch 152 is also configured for RSA security, then switch 153 knows that it has received an RSA secure frame from switch 152. Switch 153 looks up switch 152 in switch 153's RSA adjacency table and finds that switch 152 has an RSA token seed in switch 153's RSA adjacency table, meaning that switch 152 is configured for RSA security. Thus, the frame that switch 153 received from switch 152 is an RSA secure frame. Switch 153 can verify the checksum of the RSA secure frame and decrypt the RSA secure frame using a key based at least in part on switch 153's RSA token seed. In an embodiment, switch 153 decrypts the RSA secure frame with a private key corresponding to the public key of switch 153 that switch 152 used to encrypt the frame.

Switch 153 can then determine that node 105 is the next hop, and destination node, in the transmission path of the data frame. Switch 153 is configured for RSA security. If node 105 is also configured for RSA security, then switch 153 will use RSA security to transmit the data frame to destination node 105. Switch 153 can lookup node 105 in switch 153's RSA adjacency table and find that node 105 has an RSA token seed in switch 153's RSA adjacency table, meaning that node 105 is configured for RSA security. Switch 153 can encrypt the data frame with a key that is based at least in part on node 105's RSA token seed. Switch 153 can perform a checksum on the encrypted data frame and append to the checksum to the encrypted data frame, thereby generating an RSA secure frame. Switch 153 can then transmit the RSA secure frame to node 105.

Node 105 can receive the RSA secure frame from switch 153. Node 105 is configured for RSA security. If sending switch 153 is also configured for RSA security, then node 105 knows that the frame received from switch 153 is an RSA secure frame. Node 105 can look up switch 153 in node 105's RSA adjacency table and find that switch 153 has an RSA token seed in node 105's RSA adjacency table, meaning that switch 153 is configured for RSA security. Thus, the frame that node 105 received from switch 153 is an RSA secure frame. Node 105 can verify the checksum of the RSA secure frame and decrypt the RSA secure frame using a key based at least in part on node 105's RSA token seed. In an embodiment, node 105 decrypts the RSA secure frame with a private key corresponding to the public key of node 105 that switch 153 used to encrypt the frame.

Figure 1C:
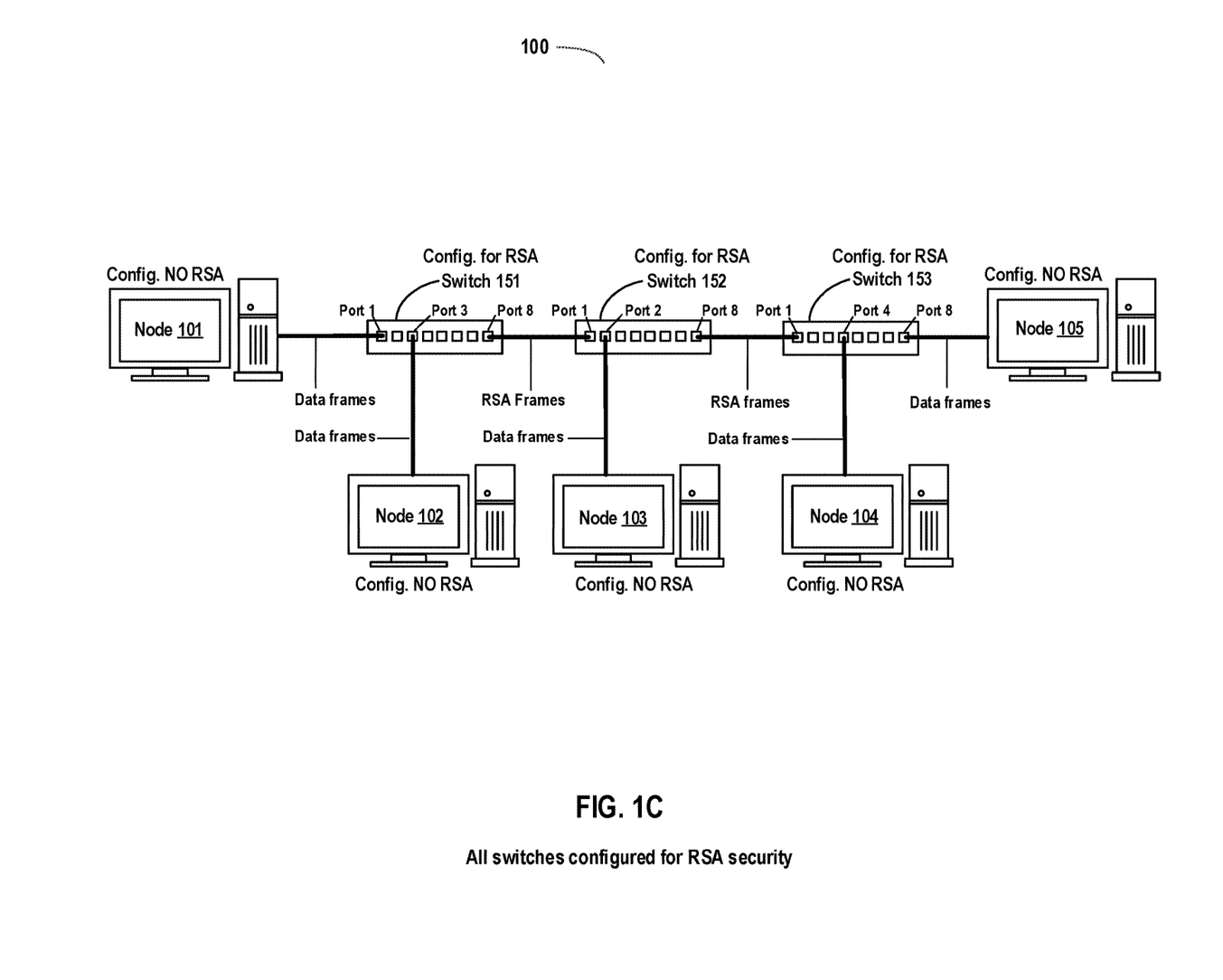

In FIG. 1C, all switches, but no nodes, are configured for RSA security. In an example, node 103 can transmit a data frame to node 104. Nodes 103 and 104 are not configured for RSA security. Intervening switches 152 and 153 are configured for RSA security. Thus, node 103 transmits an unencrypted data frame to switch 152. Switch 152 sends an RSA secure frame to switch 153, and switch 153 sends an unencrypted data frame to ending node 104.

Node 103 can determine that switch 152 is the next hop in the transmission path to destination node 104. Node 103 is not configured for RSA security, thus node 103 does not encrypt the data frame, even though switch 152 is configured for RSA security. Node 103 transmits the data frame to switch 152.

Switch 152 can receive the data frame from node 103. Switch 152 is configured for RSA security. If sending node 103 is also configured for RSA security, then switch 152 received an RSA secure frame from node 103, otherwise the frame was an unencrypted data frame. Switch 152 can lookup node 103 in switch 152's RSA adjacency table and determine that node 103 has no RSA token seed in switch 152's adjacency table, meaning that node 103 is not configured for RSA security. Therefore the data frame received by switch 152 from node 103 is not an RSA secure frame and is not encrypted.

Switch 152 can determine that switch 153 is the next hop in the transmission path to destination node 104. Switch 152 is configured for RSA security. If switch 153 is also configured for RSA security, then switch 152 will transmit the data frame to switch 153 as an RSA secure frame. Switch 152 can lookup switch 153 in switch 152's RSA adjacency table, find that there is an RSA token seed for switch 153 in switch 152's RSA adjacency table, and determine that switch 153 is configured for RSA security. Therefore, switch 152 will transmit the data frame to switch 153 as an RSA secure frame. Switch 152 can then encrypt the data frame received from node 103 using a key that is based at least in part on switch 153's RSA token seed in switch 152's RSA adjacency table. Switch 152 can then perform a checksum operation on the encrypted data frame and append the checksum to the encrypted data frame, thereby generating an RSA secure frame. Switch 152 can transmit the RSA secure frame to switch 153.

Switch 153 can receive the RSA secure frame from switch 152. Switch 153 is configured for RSA security. If sending switch 152 is also configured for RSA security, then the frame received from switch 152 is an RSA secure frame, otherwise the received frame is an unencrypted data frame. Switch 153 can lookup switch 152 in switch 153's RSA adjacency table, find that switch 152 has an RSA token seed in switch 153's RSA adjacency table, meaning that switch 152 is configured for RSA security, and that the frame received from switch 152 is an RSA secure frame. Switch 153 can then verify the checksum of the RSA secure frame and decrypt the RSA secure frame using a key that is based at least in part on switch 153's RSA token seed. In an embodiment, the key used by switch 153 to decrypt the RSA secure frame received from switch 152 is a private key of switch 153 corresponding to the public key of switch 153 used by switch 152 to encrypt the data frame.

Switch 153 can then determine that node 104 is the next, and last, hop in the transmission path to destination node 104. Switch 153 is configured for RSA security. If node 104 is also configured for RSA security, then switch 153 will transmit an RSA secure frame to node 104, otherwise switch 153 will transmit an unencrypted data frame to node 103. Switch 153 can lookup node 104 in switch 153's RSA adjacency table and determine that node 104 has no RSA token seed in switch 153's RSA adjacency table, meaning that node 104 is not configured for RSA security, and therefore switch 153 will transmit the data frame to node 104 as an unencrypted data frame. Switch 153 can then transmit the unencrypted data frame to destination node 104.

Node 104 can receive the unencrypted data frame from switch 153. Node 104 is not configured for RSA security, therefore node 104 knows that the received data frame is not an encrypted data frame.

Figure 1D:
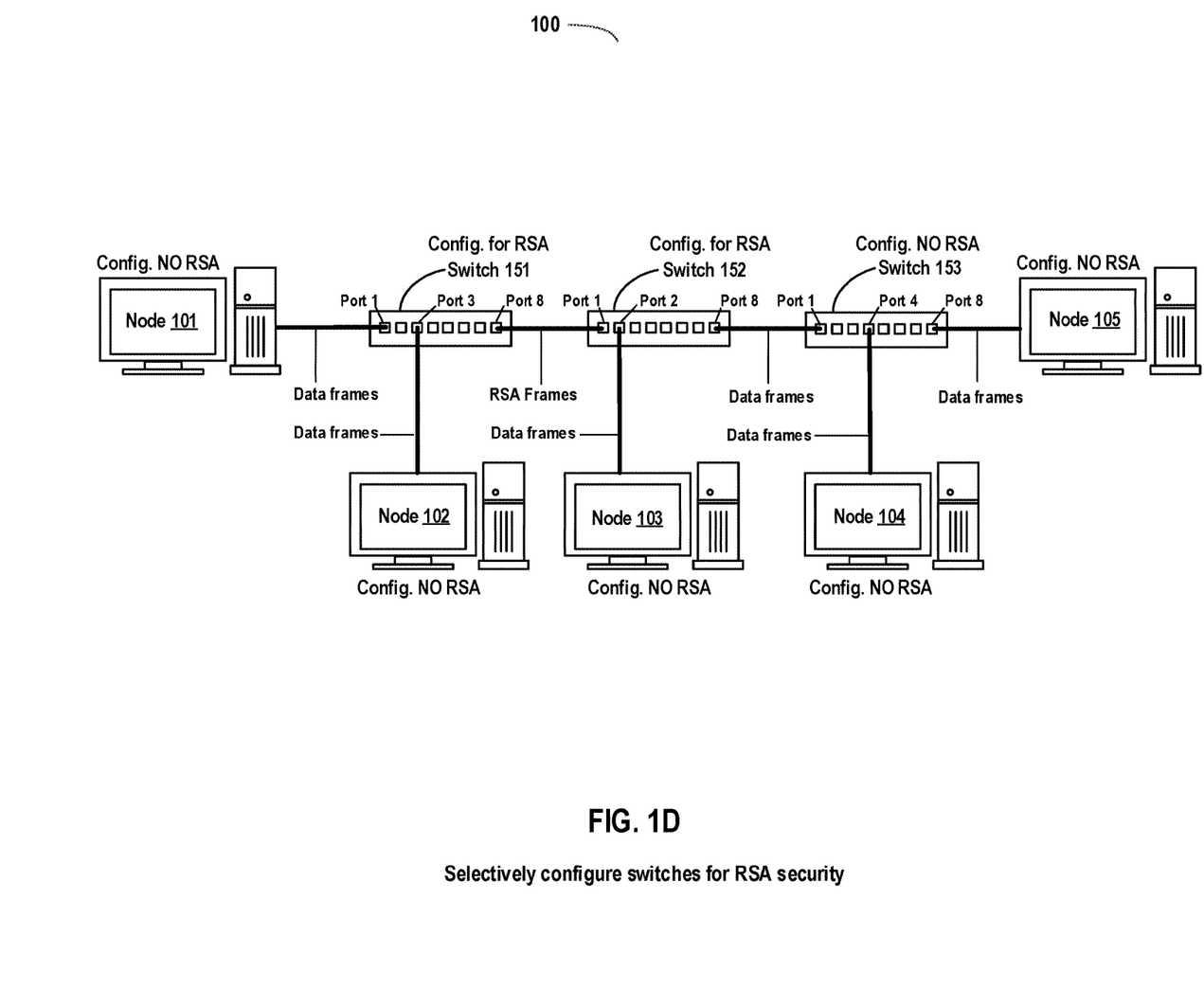

In FIG. 1D, some switches, but not all switches, are configured for RSA security. RSA security will be used between switches when both switches are configured for RSA security. In the example of FIG. 1D, switches 151 and 152 are configured for RSA security and switch 153 is not configured for RSA security. Thus, transmission between switches 151 and 152 use RSA security but transmission between switches 152 and 153 do not use RSA security. In an example, a data frame is transmitted from node 103 to node 104, via intervening switches 152 and 153. Switch 152 is configured for RSA security, and switch 153 is not configured for RSA security.

Originating node 103 is not configured for RSA security. Thus, node 103 transmits a data frame unencrypted from node 103 to switch 152.

Switch 152 receives the data frame from node 103. Switch 152 is configured for RSA security. Thus, if node 103 is configured from RSA security, then switch 152 received an RSA secure frame from node 103, otherwise switch 152 received an unencrypted data frame from node 103. Switch 152 can lookup node 103 in switch 152's RSA adjacency table, find that node 103 has no RSA token seed, and therefore node 103 is not configured for RSA security. Thus, the data frame received from node 103 is not an RSA secure frame and is an unencrypted data frame. The next hop in the transmission path to destination node 104 is switch 153.

Switch 152 is configured for RSA security. If switch 153 is also configured for RSA security, then switch 152 will transmit an RSA secure frame to switch 153, otherwise switch 152 will transmit an unencrypted data frame to switch 153. Switch 152 can lookup switch 153 in switch 152's RSA adjacency table, find that there is no RSA token seed for switch 153 in switch 152's RSA adjacency table, and therefore switch 152 is not configured for RSA security. Thus, switch 152 transmits an unencrypted data frame to switch 153.

Switch 153 receives the data frame from switch 152. Switch 152 is not configured for RSA security, therefore the frame received from switch 153 is an unencrypted data frame, not an RSA secure frame. Switch 153 can determine that node 104 is the next, and last, hop in the transmission path to node 104. Switch 153 is not configured for RSA security, thus even if node 104 was configured for RSA security (which it is not), switch 153 would not transmit the data frame using RSA security because both sending device and receiving device need to be configured for RSA security to transmit an RSA secure frame. Thus, switch 153 transmits the unencrypted data frame to node 104.

Node 104 receives the data frame from switch 153. Node 104 is not configured for RSA security. Since transmission of an RSA secure frame occurs when both the sending device and receiving device are configured for RSA security, and node 104 (the receiving device) is not configured for RSA security, then node 104 knows that it has received an unencrypted data frame.

Figure 2:
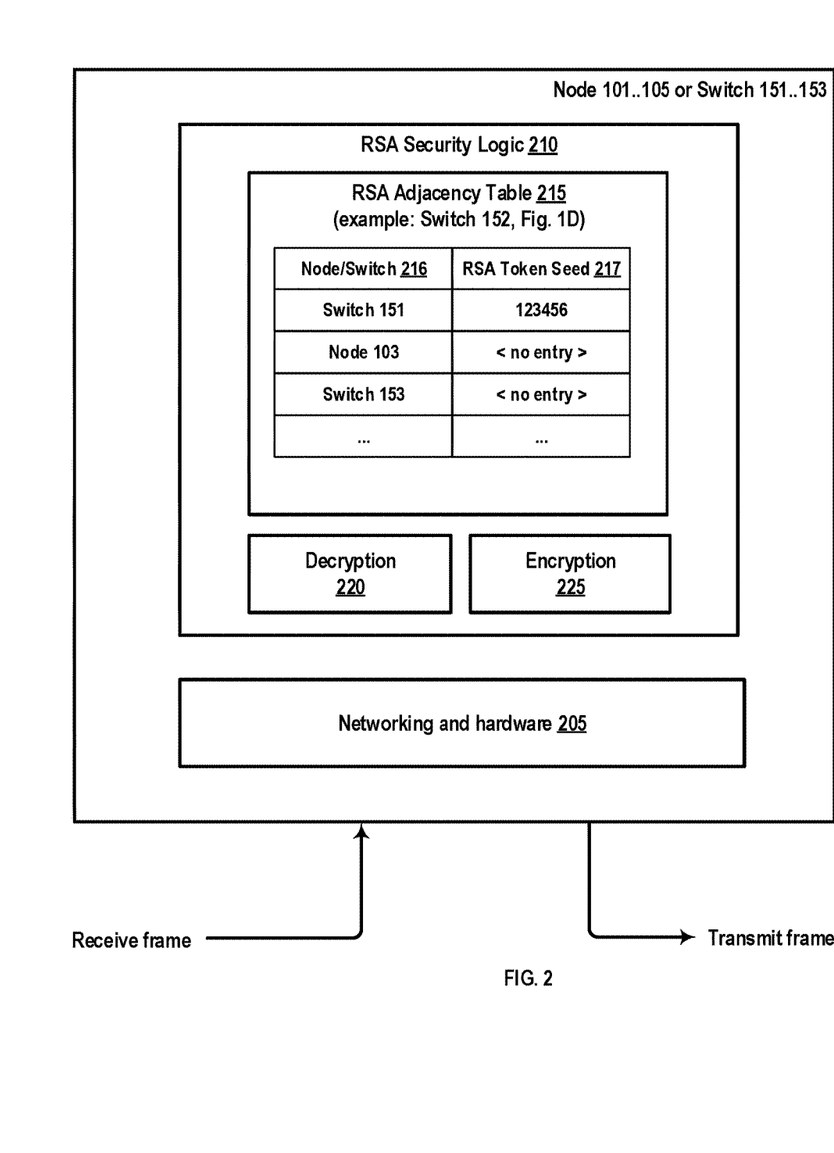
FIG. 2 illustrates, in block diagram form, internal components of a node or a switch in a switched network having enhanced security that is individually configurable for each device in a "hop" in a switched network, in accordance with some embodiments.

FIG. 2 illustrates, in block diagram form, internal components 200 of a node or a switch in a switched network having enhanced security, individually configurable for each "hop" in a switched network, in accordance with some embodiments.

An RSA secure device, such as a nodes 101-105 or switches 151-153, can include networking and hardware 205 and RSA security logic 210, among other components. Representative networking and hardware 205, usable for a node or a switch, is described below with reference to computing device 600 in FIG. 6. Different components of a computing device may be used for a switch than for a node device.

RSA security logic 210 can include RSA adjacency table 215, decryption module 220, and encryption module 225. RSA security logic 210 can further include components that can compute and verify a checksum, lookup a device in nodes/switches 216 in RSA adjacency table 215, determine whether an RSA token seed 217 is present for a listed node/switch 216, regenerate RSA token seeds 217 periodically, and generate one more encryption keys based at least in part on RSA token seed 217.

A node 101 . . . 105 or switch 151 . . . 153 can receive a frame from an adjacent device (node or switch), process the frame using RSA security logic 210, and transmit the frame to a next device (node or switch) on a transmission path. Processing the frame can include determining whether both the sending and receiving devices have RSA security enabled, and if so, verifying the checksum of the received frame, and decrypting the frame using a key generated by RSA security logic 210. Processing the frame can also include encrypting a data frame using a key generated by RSA security logic 210, generating a checksum of the encrypted frame, and appending the checksum to the encrypted frame to generate the RSA secure frame.

Figure 3:
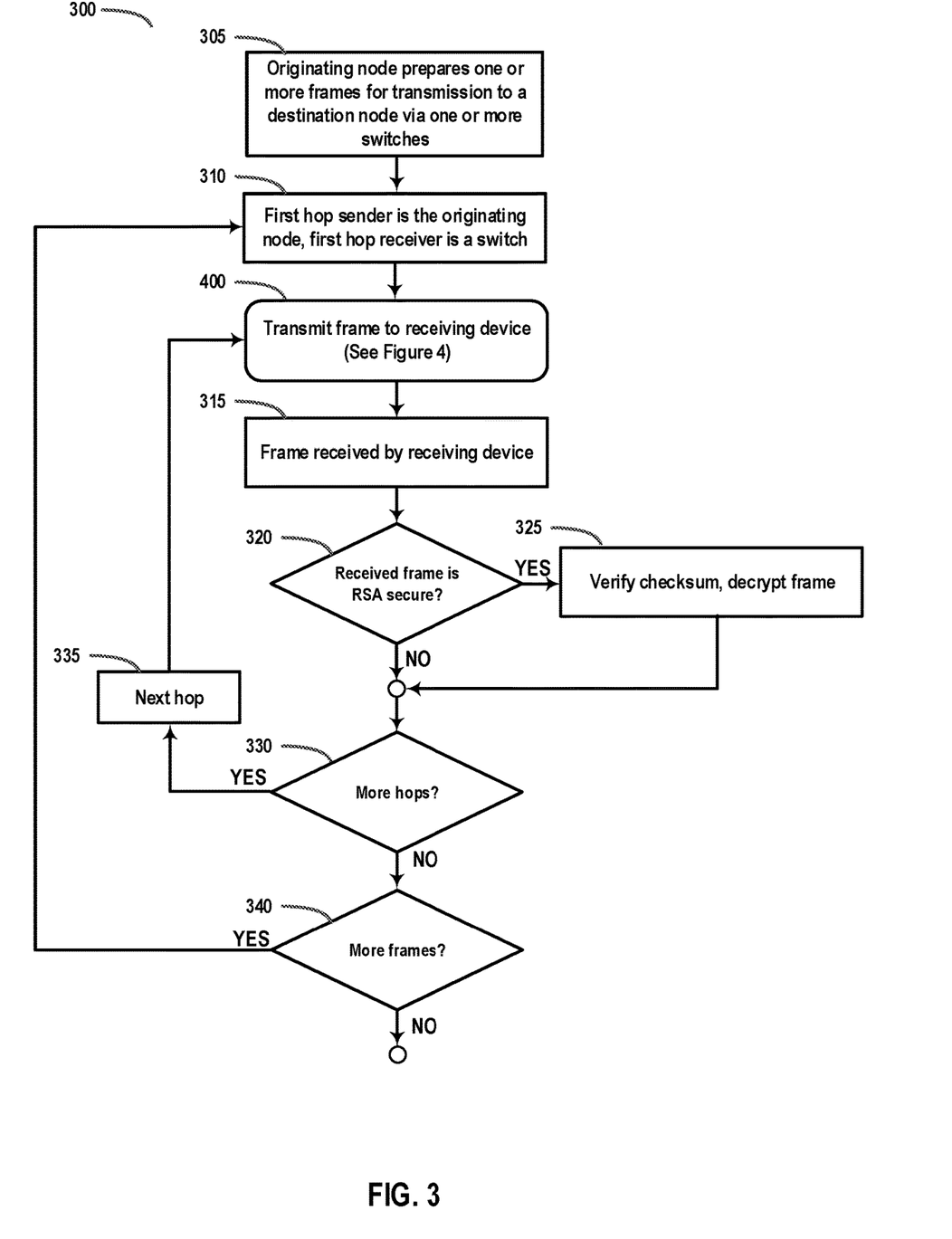
FIG. 3 illustrates, in block diagram form, a method of providing configurable, enhanced security between nodes and switches in a switched network, in accordance with some embodiments.

FIG. 3 illustrates, in block diagram form, a method 300 of providing configurable, enhanced security between nodes and switches in a switched network, in accordance with some embodiments.

In operation 305, a sending node, e.g. 101-105, can generate one or more data frames for transmission to a receiving node, via one or more intervening switches, e.g. 151-153.

In operation 310, the first hop receiving device is a switch.

In operation 400, sending device transmits a data frame to the receiving device. The first sending device will be a node and the first receiving device will be a switch. Subsequent hops will have a sending device that is a switch and a receiving device that is a switch or the destination node. If, for any given hop in the transmission path between the sending node and destination receiving node, the sending device and the receiving device for the hop are both configured for RSA operation, then in operation 400 the data frame to be transmitted will be prepared into an RSA secure frame. Operation 400 is described in detail with reference to FIG. 4, below.

In operation 315, the frame transmitted in operation 400 is received by the receiving device (switch or destination node).

In operation 320, it can be determined whether the received frame is an RSA secure frame. The received frame will be an RSA secure frame if the sending device (intervening switch or originating node) and the receiving device (intervening switch or destination node) are both configured for RSA security. The receiving device can make that determination. The receiving device can determine that it is configured for RSA security. The receiving device can determine whether the send device is configured for RSA security by looking up the sending device in the receiving device's RSA adjacency table and determining that the sending device has an RSA token seed. If so, then both the sending and receiving devices for the hop are configured for RSA security and the data frame received by the receiving device is an RSA secure frame. If the received frame is an RSA secure frame, then method 300 continues at operation 325, otherwise method 300 continues at operation 330.

In operation 325, the received frame is an RSA secure frame. The receiving device can isolate the checksum from the RSA secure frame and perform a verification of the checksum on the received RSA secure frame to verify that the RSA secure frame has not changed since it was sent by the sending device. Next the receiving device can decrypt the encrypted RSA secure frame using a private key that is based at least in part on the RSA token seed for the receiving device.

In operation 330, it can be determined whether there are more hops to reach the destination node. If so, then method 300 continues at operation 335. Otherwise, method 300 continues at operation 340.

In operation 335, the current receiving device becomes the sending device, and the receiving device of the next hop becomes the receiving device. Method 300 continues at operation 400, wherein the data packet is processed and transmitted to the receiving device.

In operation 340, it can be determined whether there are more frames to be transmitted from the originating node to the destination node via one or more intervening switches. If so, then method 300 continues at operation 310. Otherwise method 300 ends.

Figure 4:
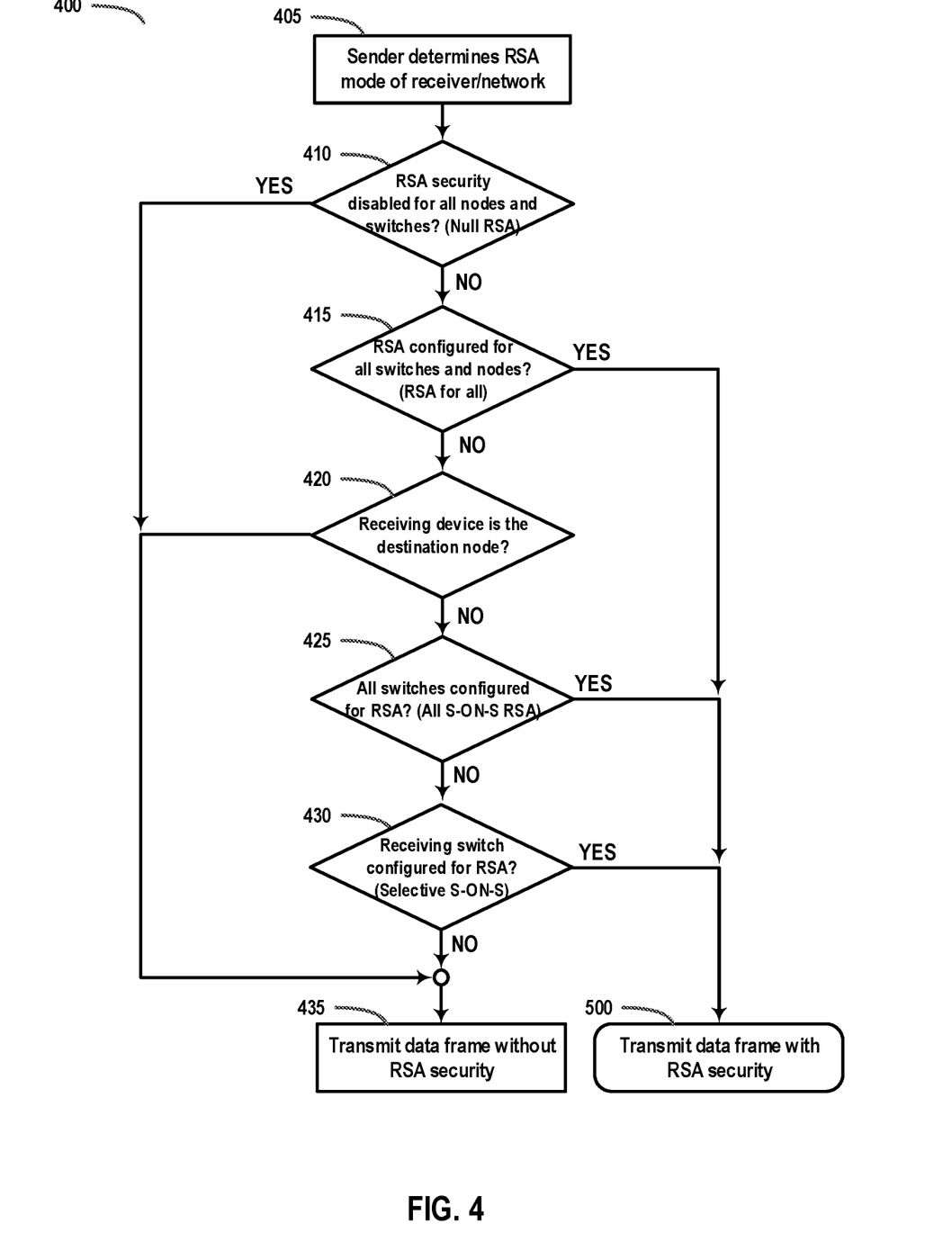
FIG. 4 illustrates, in block diagram form, a method of providing configurable enhanced security between nodes and switches in a switched network, in accordance with some embodiments.

FIG. 4 illustrates, in block diagram form, a method 400 of providing configurable enhanced security for nodes and switches in a switched network, in accordance with some embodiments. In an embodiment, method 400 can be called from method 300.

In operation 405, the sending device determines an operation mode of the network. In "RSA null" mode, RSA is disabled for all nodes and switches. In "RSA for all" mode, all nodes and all switches in the switched network are configured to use RSA security. In "All switch-on-switch mode" all switches, but no nodes, are configured for RSA security. In "Selective switch-on-switch" mode, some switches, by no nodes, are configured for RSA security. Global settings, such "RSA null," mode, "RSA for all," mode, and "all switch-on-switch" mode can be configured globally for all devices, such that all nodes and switches in the network are configured to a global setting that can be discovered by any configured device. In selective switch-on-switch mode, each hop needs to be examined as has been described above, throughout this document.

In operation 410, if any device in the network, e.g. the sending or receiving device for a hop, is configured for RSA null, then RSA security is disabled for all devices and method 400 continues at operation 435, wherein the data frame is transmitted without using RSA security. Otherwise, method 400 continues at operation 415.

Figure 5:
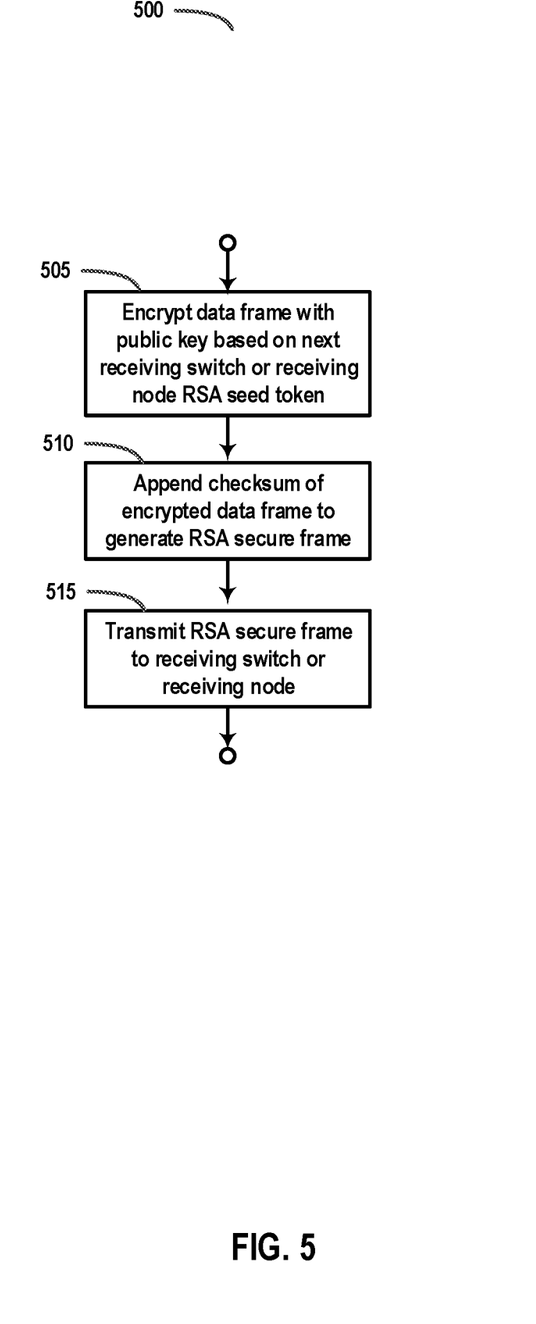
FIG. 5 illustrates, in block diagram form, providing configurable enhanced security between nodes and switches in a switched network, in accordance with some embodiments.

In operation 415, if any device in the network, e.g. the sending or receiving device, is configured for RSA for all, then RSA security is enabled for all nodes and all switches in the network, and method 400 continues at operation 500, wherein the data frame will be transmitted using RSA security. Otherwise, method 400 continues at operation 420.

In operation 420, it can be determined whether the receiving device is the destination node. From operation 415, above, it has already been determined that RSA-for-all is not enabled. In all other network modes than RSA-for-all, nodes of the switched network are not configured for RSA security. Therefore, if the receiving device for the hop is the destination node, then the destination node does not have RSA security enabled, and method 400 continues at operation 435 where the data frame is transmitted without RSA security. Otherwise, method 400 continues at operation 425.

In operation 425, it can be determined whether all switches are configured for RSA security, using "RSA for all-switch-on-switch" mode. It has already been determined in operation 420 that the receiving device for this hop is not the destination node, therefore the receiving device is a switch. Thus, if RSA for all switch-on-switch mode is enabled, then the switch is configured for RSA security and method 400 continues at operation 500. Otherwise method 400 continues at operation 430.

In operation 430, it can be determined whether the receiving switch is configured for RSA, such as by the network being configured as RSA for selective switch-on-switch mode. If the receiving switch is configured for RSA security, then method 400 continues at operation 500 wherein the data frame is packaged as an RSA secure frame and transmitted to the receiving switch. Otherwise method 400 continues at operation 435, wherein the data frame is transmitted unencrypted, without RSA security.

In operation 435, the data frame is transmitted to the receiving device without RSA security, and unencrypted.

FIG. 5 illustrates, in block diagram form, a method 500 of providing configurable enhanced security between nodes and switches in a switched network, in accordance with some embodiments. In an embodiment, method 500 is called from method 400, to generate an RSA secure frame.

In operation 505, the data frame to be transmitted as an RSA secure frame is encrypted using a key generated based at least in part using an RSA token seed of the receiving device. The RSA token seed can be obtained from the RSA adjacency table of the sending device. The RSA token seed can be periodically regenerated. In an embodiment, the period is every 24 hours.

In operation 510, RSA security logic 210 can generate a checksum of the encrypted data frame and append the checksum to the encrypted data frame, thereby generating an RSA secure frame.

In operation 515, the RSA secure frame can be transmitted to the receiving device, whether it be a switch or a destination node.

Figure 6:
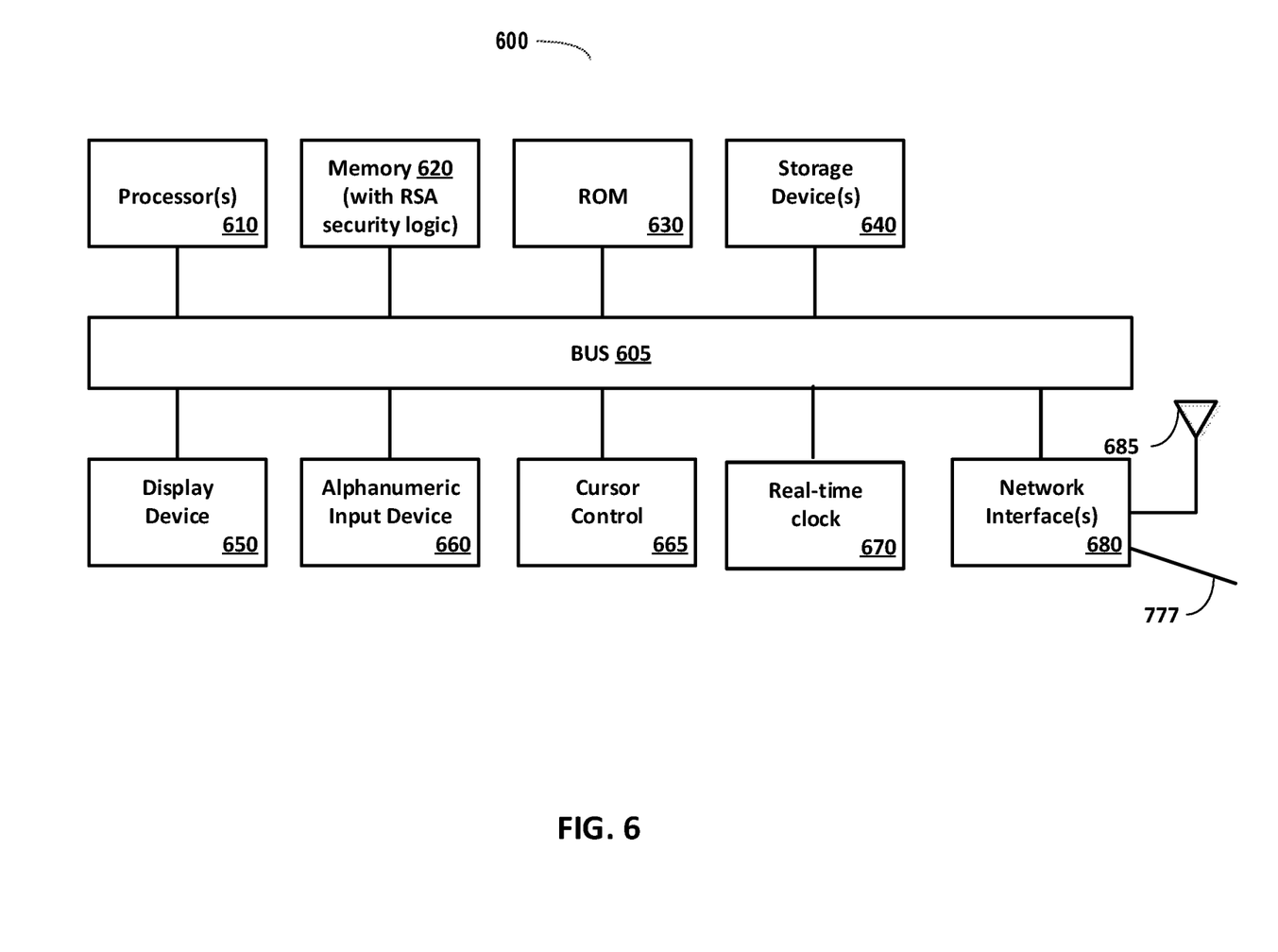
FIG. 6 illustrates, in block diagram form, an exemplary computing system for implementing concepts described herein.

FIG. 6 is a block diagram of one embodiment of a computing system 600. The computing system illustrated in FIG. 6 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 6 may be used to provide a computing device and/or a server device.

Computing system 600 includes bus 605 or other communication device to communicate information, and processor 610 coupled to bus 605 that may process information.

While computing system 600 is illustrated with a single processor, computing system 600 may include multiple processors and/or co-processors 610. Computing system 600 further may include random access memory (RAM) or other dynamic storage device 620 (referred to as main memory), coupled to bus 605 and may store information and instructions that may be executed by processor(s) 610. Main memory 620 may also be used to store temporary variables or other intermediate information during execution of instructions by processor 610. Main memory 620 can further include executable programs, application programming interfaces (APIs), frameworks, and other executable program code to implement the RSA security logic described herein, and as detailed in at least FIG. 2, above.

Computing system 600 may also include read only memory (ROM) 630 and/or other static, non-transitory storage device 640 coupled to bus 605 that may store static information and instructions for processor(s) 610. Data storage device 640 may be coupled to bus 605 to store information and instructions. Data storage device 640 such as flash memory or a magnetic disk or optical disc and corresponding drive may be coupled to computing system 600.

Computing system 600 may also be coupled via bus 605 to display device 650, such as a light-emitting diode display (LED), liquid crystal display (LCD), or touch screen display to display information to a user. Computing system 600 can also include an alphanumeric input device 660, including alphanumeric and other keys, which may be coupled to bus 605 to communicate information and command selections to processor(s) 610. Another type of user input device is cursor control 665, such as a touchpad, a mouse, a trackball, or cursor direction keys to communicate direction information and command selections to processor(s) 610 and to control cursor movement on display 650. Computing system 600 may further include a real-time clock 670. The real-time clock 670 may be used for generating date/time stamps for data records, computing elapsed time, and other time-keeping functions. A real-time clock 670 can be a battery-backed chipset with a settable date and time. Alternatively, a real-time clock 670 may include logic to retrieve a real-time from a network source such as a server or an Internet server via network interfaces 680, described below. Real-time clock 670 can be used to determine a period for RSA token regeneration, such as 24 hours.

Computing system 600 further may include one or more network interface(s) 680 to provide access to a network, such as a local area network. Network interface(s) 680 may include, for example, a wireless network interface having antenna 685, which may represent one or more antenna(e). Computing system 600 can include multiple wireless network interfaces such as a combination of WiFi, Bluetooth® and cellular telephony interfaces. Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of transmitting a message over a switched network comprising a plurality of devices, the method, comprising:

for each of a plurality of hops in transmitting the message over the switched network, determining, by a sending first device, whether a receiving second device for the hop is configured for secure transmission;
in response to determining that the receiving second device is configured for secure transmission:
encrypting, by the sending first device, an unencrypted data frame using an encryption key of the receiving second device; and
transmitting the encrypted data frame to the receiving second device;
otherwise transmitting, by the sending first device, the unencrypted data frame to the receiving second device without encryption;
wherein the unencrypted data frame is encrypted for at least one hop of the plurality of hops, and the unencrypted data frame is not encrypted for at least one hop of the plurality of hops.

2. The method of claim 1, wherein the encryption key of the receiving second device comprises a public key of the receiving second device.

3. The method of claim 1, wherein the encryption key of the receiving second device is based at least in part on a token seed of the receiving second device, stored on the sending first device.

4. The method of claim 3, wherein the token seed of the receiving second device is regenerated at a periodic interval.

5. The method of claim 1, further comprising, before the encrypting:
decrypting, by the sending first device, the data frame using a decryption key of the sending first device.

6. The method of claim 5, wherein the decryption key of the sending first device comprises a private key of the sending first device, based at least in part on a token seed of the sending first device.

7. The method of claim 1, wherein the sending first device and the receiving second device are both network switches, and all hops in the plurality of hops that are used to transmit the message that are between network switches encrypt the data frame before transmission, and at least one hop between a node and a network switch does not encrypt the data frame before transmission.

8. A non-transitory computer-readable medium programmed with executable instructions that, when executed by a processing system having at least one hardware processor, perform operations for transmitting a message over a switched network comprising a plurality of devices, the operations comprising:
for each of a plurality of hops in transmitting the message over the switched network, determining, by a sending first device, whether a receiving second device for the hop is configured for secure transmission;
in response to determining that the receiving second device is configured for secure transmission:
encrypting, by the sending first device, an unencrypted data frame using an encryption key of the receiving second device; and
transmitting the encrypted data frame to the receiving second device;
otherwise transmitting, by the sending first device, the unencrypted data frame to the receiving second device without encryption;
wherein the unencrypted data frame is encrypted for at least one hop of the plurality of hops, and the unencrypted data frame is not encrypted for at least one hop of the plurality of hops.

9. The medium of claim 8, wherein the encryption key of the receiving second device comprises a public key of the receiving second device.

10. The medium of claim 8, wherein the encryption key of the receiving second device is based at least in part on a token seed of the receiving second device, stored on the sending first device.

11. The medium of claim 10, wherein the token seed of the receiving second device is regenerated at a periodic interval.

12. The medium of claim 8, further comprising, before the encrypting:
decrypting, by the sending first device, the data frame using a decryption key of the sending first device.

13. The medium of claim 12, wherein the decryption key of the sending first device comprises a private key of the sending first device, based at least in part on a token seed of the sending first device.

14. The medium of claim 13, wherein the sending first device and receiving second device are both network switches, and all hops in the plurality of hops that are between network switches encrypt the data frame before transmission, and at least one hop between a node and a network switch does not encrypt the data frame before transmission.

15. A system comprising:
a processing system having at least one hardware processor, the processing system coupled to a memory programmed with executable instructions that, when executed by the processing system, perform operations for transmitting a message over a switched network comprising a plurality devices, the operations comprising:
for each of a plurality of hops in transmitting the message over the switched network,
determining, by a sending first device, whether a receiving second device is configured for secure transmission;
in response to determining that the receiving second device is configured for secure transmission:
encrypting, by the sending first device, an unencrypted data frame using an encryption key of the receiving second device; and
transmitting the encrypted data frame to the receiving second device;
otherwise transmitting, by the sending first device, the unencrypted data frame to the receiving second device without encryption;
wherein at least one hop of the plurality of hops encrypts the unencrypted data frame and at least one hop of the plurality of hops does not encrypt the unencrypted data frame, before transmitting the data frame.

16. The system of claim 15, wherein the encryption key of the receiving second device comprises a public key of the receiving second device.

17. The system of claim 15, wherein the encryption key of the receiving second device is based at least in part on a token seed of the receiving second device, stored on the sending first device.

18. The system of claim 17, wherein the token seed of the receiving second device is regenerated at a periodic interval.

19. The system of claim 15, further comprising, before the encrypting:
decrypting, by the sending first device, the data frame using a decryption key of the sending first device.

20. The system of claim 19, wherein the decryption key of the sending first device comprises a private key of the sending first device, based at least in part on a token seed of the sending first device.

21. The system of claim 20, wherein the sending first device and the receiving second device are both network switches, and all hops in the plurality of hops that are between network switches encrypt the data frame and at least one hop between a node and a network switch does not encrypted the data frame.

* * * * *